Feb. 10, 1931.  W. G. VOGEL  1,791,588
TANK VEHICLE CONSTRUCTION
Filed Nov. 26, 1927   3 Sheets-Sheet 1
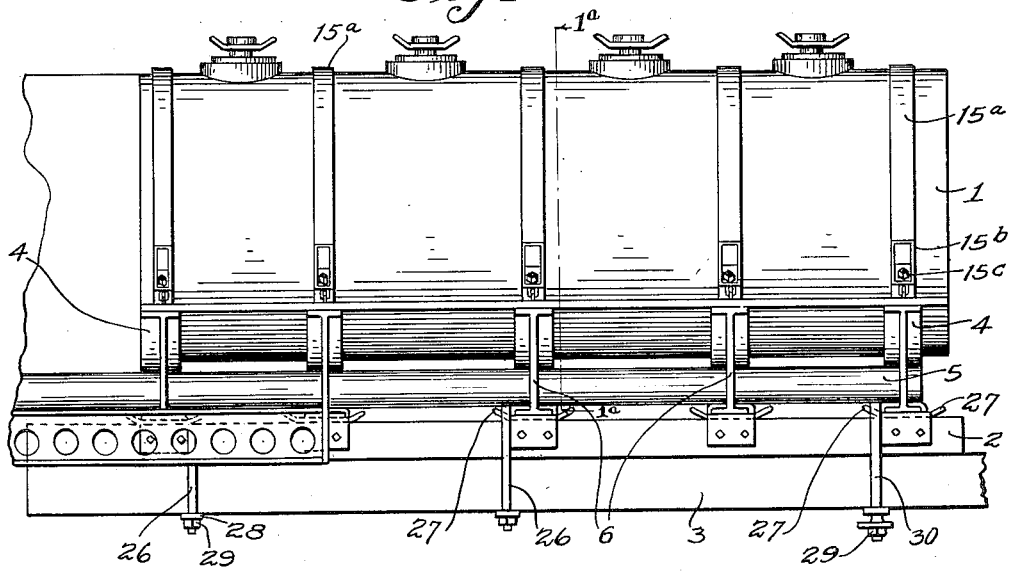
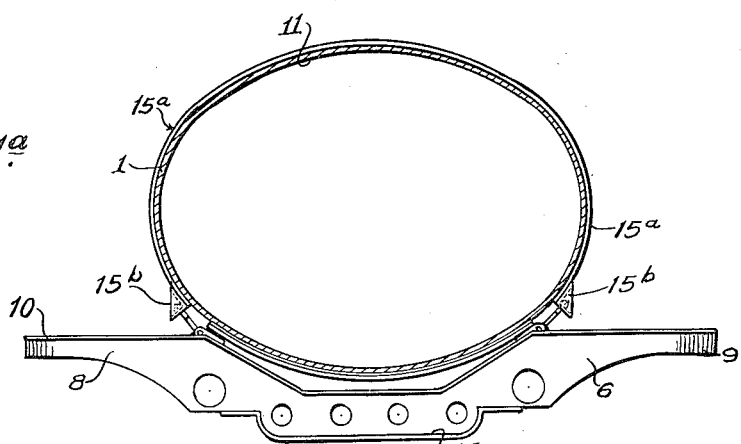
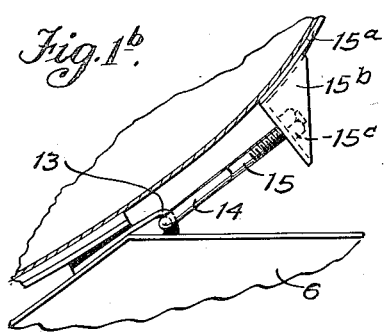
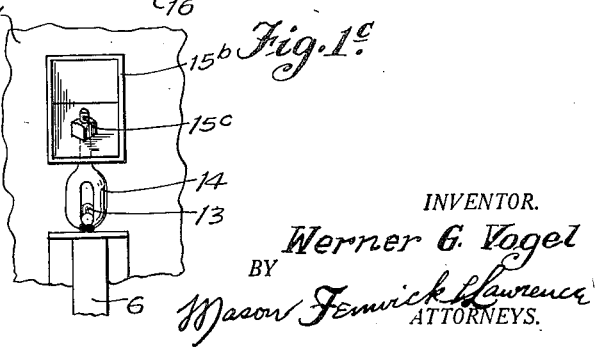
INVENTOR.
Werner G. Vogel
BY
Mason Fenwick Lawrence
ATTORNEYS.

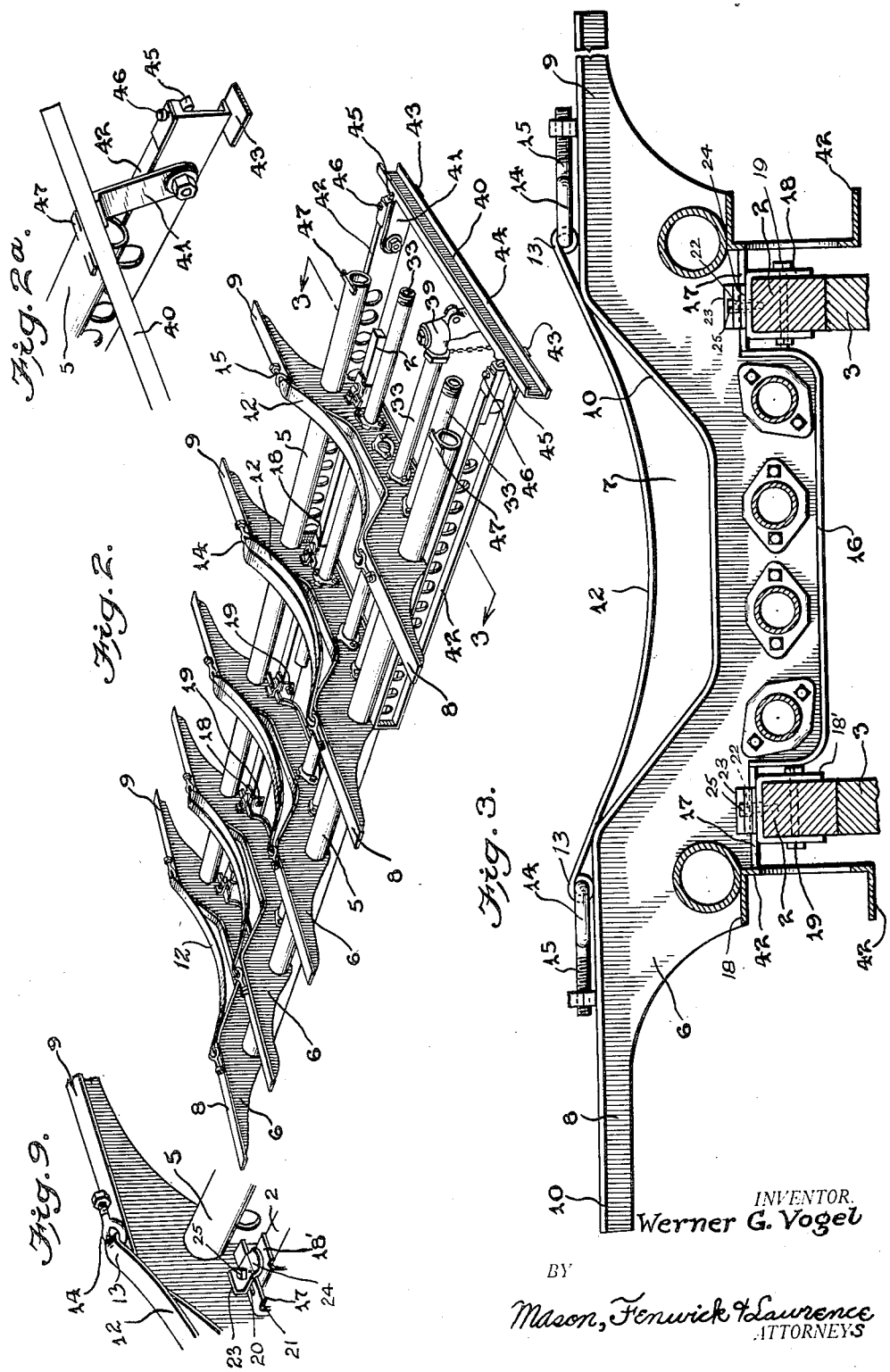

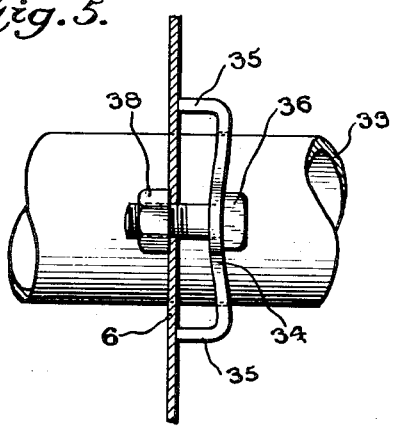
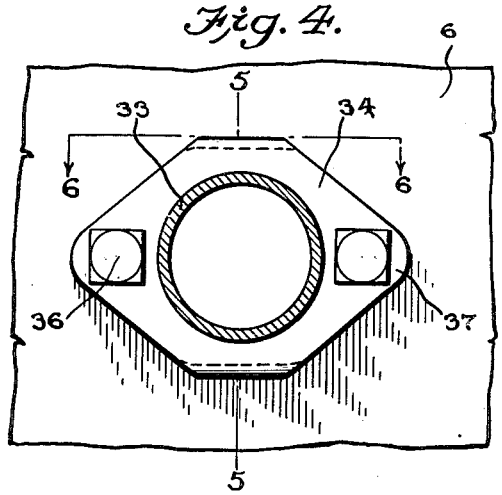
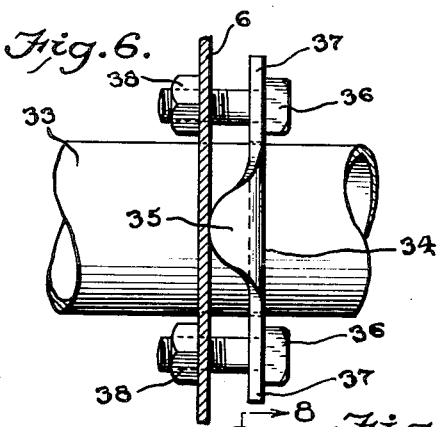
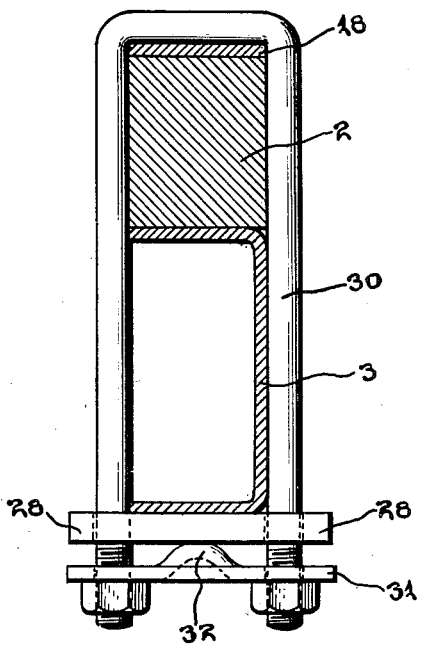
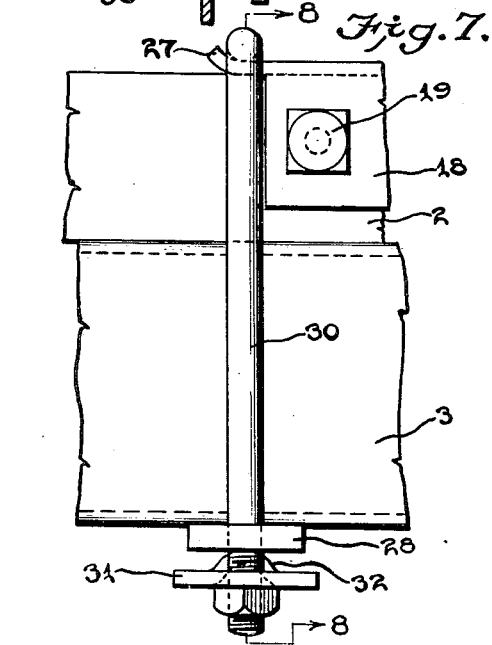

Patented Feb. 10, 1931

1,791,588

UNITED STATES PATENT OFFICE

WERNER G. VOGEL, OF LOUISVILLE, KENTUCKY, ASSIGNOR TO HENRY VOGT MACHINE COMPANY, OF LOUISVILLE, KENTUCKY

TANK-VEHICLE CONSTRUCTION

Application filed November 26, 1927. Serial No. 235,905.

The invention forming the subject matter of this application is a cradle structure adapted to be detachably connected to a truck chassis to provide a strong safe support for oil or gasoline tanks.

An object of this invention is to provide a construction adapted to resist all stresses resulting from heavy liquid loads on moving road vehicles.

Another object of the invention is to provide an adjustable connection between the tank supporting structure and the sills therefor, to enable the tank to be readily transferred from one chassis to another.

A further object of the invention is to provide flexible strap supports and clamps for the tank which conform to the contour of the tank and thereby eliminate strains thereon.

A still further object of the invention is to provide the tank-supporting structure with pipe clamps which not only prevent vibration and rattle, but also minimize the possibilities of distorting the bottom of the tank through rear end collision.

Other objects of the invention will appear as the detailed description thereof proceeds.

In the drawings:

Figure 1 is a side elevation of part of a tank vehicle constructed in accordance with this invention;

Figure 1a is a vertical cross section on line 1a—1a of Figure 1;

Figure 1b is a fragmentary detail elevation to an enlarged scale of a tank-securing strap;

Figure 1c is a fragmentary end elevation of the parts shown in Figure 1b;

Figure 2 is a perspective view of the chassis frame of the vehicle and the tank supporting cross members connected thereto;

Figure 2a is a fragmentary perspective view of bumper mechanism shown in Figure 2;

Figure 3 is a transverse vertical section on the line 3—3 of Figure 2;

Figure 4 is an elevation of a pipe clamp of peculiar construction adapted to engage the periphery of a pipe and clamp it to a transverse member perpendicular thereto;

Figure 5 is a vertical section on the line 5—5 of Figure 4;

Figure 6 is a horizontal section on the line 6—6 of Figure 4;

Figure 7 is a fragmentary side elevation of a flexible U-bolt connection between a wooden sill of the under frame and the chassis frame;

Figure 8 is a vertical section on the line 8—8 of Figure 7;

Figure 9 is an enlarged perspective view of the means for adjustably clamping the tank supporting bolsters of this invention to wooden sills adapted to seat on the truck frame.

As shown in the drawings, the tank 1 is supported as a whole on bolsters secured together to form a cradle mounted on wooden sills 2 which are adjustable toward and from each other to be detachably secured to the runners or side beams 3 of a truck chassis frame.

The tank supporting structure or cradle, adjustably secured to sills 2, comprises a plurality of formed and welded steel bolsters 4 spaced apart along and welded to a pair of tubes 5.

Each bolster 4 comprises a web 6 having its upper edge provided with a central recess 7 adapted to receive the convex lower part of the tank 1. On each side of the recess 7, the bolster is provided with straight alined parts 8 and 9, and a flange 10 extends from one end to the other of the upper edge of the web 6. These outer straight edged parts 8 and 9 are adapted to support running boards 11 on each side of the tank 1.

Tank supporting metal slings 12 are welded to the bolsters 4 at each end of the recesses 7; and each end of these slings is bent to form a welded loop 13 pivotally engaging the eye 14 of an eyebolt 15 which serves as an adjustable anchor for one end of one of a series of straps 15a which holds the tank 1 securely to its cradle. Each end of a strap 15a has welded thereto a plate member 15b provided with a suitable aperture to receive the threaded shank of the eyebolt 15 and to serve as a seat for the nut 15c.

The lower edge of web 6 is provided with a flange 16 which terminates at its opposite ends in short flanges 17 at the inner ends of recesses 18 formed in the web 6. It is to be understood that the flanges so far described extend on opposite sides of web 6, although only one side of each bolster is shown in the drawings.

The sills 2 running lengthwise of the whole bolster structure are adjustably connected thereto by U-shaped straps 18' bolted to said sills 2 by bolts 19, the straps 18' being long enough to extend beyond opposite sides of the bolsters under which they are adapted to be positioned. Each of the flanges 17, on opposite sides of web 6, is provided with a slot 20 parallel to the web 6; and a washer plate 21 having a bolt receiving aperture 22 is mounted over said flange 17 with one upturned end 23 against the web 6, and a downwardly offset end 24 resting on strap 18. Bolts 25, passing through apertures 22, slots 20 and sills 2 secure the latter firmly to the metallic bolster tank supporting structure. The slots 20 in flanges 17 permit the bolts 25 to slide parallel to the web 6, to provide for movement of the sills 2 toward and from each other in order to permit the seating of the frame-supporting sills on chassis of different widths.

In order to secure the under frame sills 2 to the sides 3 of the chassis frame, I employ in certain parts, a flexible U-bolt of special construction. As shown in Figure 1, the rear ends of sills 2 are bolted to the sides 3 of the chassis frame by ordinary U-bolts 26 extending over upturned extensions 27 of the straps 18 and having their depending legs connected by cross-plates which are clamped hard against the bottoms of sides 3 by the nuts 29 on the screwthreaded ends of said legs.

The U-bolts 30 (Figures 1, 7 and 8), have longer legs than bolts 26; and are constructed so that the plate is pressed somewhat yieldingly against the bottoms of sides 3. To effect this, a second plate 31, having at the center thereof a stamped up projection 32, is slidably arranged on the legs of U-bolt 30 with the top of projection 32 in contact with the bottom of plate 8. Nuts 29 on the legs of bolt 30 may be turned to clamp the plate 28 firmly against the bottom of sides 3.

It will be apparent from Figure 8 that the plate 28 may rock about projection 32 to allow for slight movements of the underframe, and by distributing vibration and shocks over the greater part of the chassis frame, eleminates the possibilities of cracking the frame at this point.

In order to secure the draw-off pipes 33 firmly in the tank supporting frame I employ clamping plates of special construction (see Figures 4, 5 and 6). The pipes 33 are passed through closely fitting apertures in the webs 6 of the bolsters, and clamping plates 34 having apertures closely fitting pipes 33 are passed along said pipes unto their upturned lugs 35 contact with said webs. Bolts 36 passing through registering apertures in plates 34 and webs 6 at the non-contacting lugs 37 when tightened up by nuts 38 draw down the lugs 37 and cause the plate 34 to pinch the sides of pipes 33 tighter.

The pipe clamping construction just described prevents rattle and vibration of the pipes and also minimizes the possibilities of distorting the bottom of the tank through rear end collision.

The usual dispensing faucets 39 may be attached to the ends of these drain pipes as desired.

In order to provide protection for the rear end of the tank supporting structure and for the dispensing faucets, I have provided this structure with a lift type bumper bar 40 pivoted by lugs 41 to the under faces of two channel members 42, which are firmly welded or secured to the bolster tubes 5. Plates 43 riveted or welded to the ends of members 42 engage the bottom 44 of bar 40 to support it in operative position as a bumper; and spring projected bolts 45, which may be manually withdrawn by knobs 46, are suitably secured to said members 42 to hold the bar 40 normally locked in operative position. Flat-lugs 47 are welded on the ends of tubes 5 to support anything such as a bucket box, which might be found desirable to use. The operation of this bumper mechanism will be obvious from inspection of the drawing.

From the disclosures herein, it will be evident that I have constructed a tank supporting and dispensing structure of extreme rigidity, and have provided it with parts so arranged as to eliminate all distortion of the tank and structure and reduce vibration to a minimum.

What I claim is:

1. A cradle support for vehicle tanks including a bolster having a pair of alined straight edges adapted to support running boards and having a tank receiving recess between said straight edges, a flexible sling welded to said bolster and suspended in said recess and having its opposite ends bent to form loops, eyebolts hinged to said loops, and a flexible strap having its opposite ends adjustably connected to the ends of said sling.

2. A cradle for vehicle tanks including a bolster having a central recess, a flexible tank-supporting sling welded at its opposite ends to said bolster and suspended in said recess, a strap, and means adjustably connecting the opposite ends of said sling to the opposite ends of said strap for holding the tank seated in said sling.

3. A cradle for vehicle tanks having a dispensing pipe extending lengthwise therethrough, a bumper pivotally secured to said cradle and movable to positions preventing or permitting access to the dispensing end of said pipe, and a manually operable bolt for locking said bumper in position to prevent access to said end.

In testimony whereof I affix my signature.

WERNER G. VOGEL.